Patented Nov. 3, 1942

2,300,686

UNITED STATES PATENT OFFICE 2,300,686

LEAD RESINATE AND METHOD OF PRODUCING

Paul R. Mosher, Wilmington, Del., assignor to Hercules Powder Company, Wilmington, Del., a corporation of Delaware No Drawing. Application September 4, 1941, Serial No. 409,535

8 Claims. (Cl. 260—105)

This invention relates to the production of fused lead resinates and more particularly to fused lead resinates of improved characteristics and to the method of production thereof.

Wood and gum rosins have been neutralized with lead compounds to form the corresponding lead salts of the rosin acids. The production of such lead resinates has been carried out either by fusing the rosin with a suitable lead compound or by a double decomposition procedure involving treatment of a water-soluble salt of the rosin with a soluble lead salt. By such procedures acid resinates or neutral resinates have been prepared containing an amount of lead up to the theoretical amount required to give the neutral salt such as lead diabietate.

It is an object of this invention to provide lead resinates of higher lead content than has heretofore been possible.

It is another object to provide fused lead resinates of high lead content which possess many improved characteristics.

It is a further object to provide a method of producing fused lead resinates of high metal content.

Other objects of the invention will appear hereinafter.

The above objects are accomplished in accordance with this invention by fusing a polymerized rosin with a sufficient amount of a lead compound capable of reaction with the polymerized rosin, at a temperature within the range of about 190° C. to about 330° C. to give a lead resinate of the polymerized rosin having a lead content greater than the equivalent combining proportion of the polymerized rosin based on its acidity and as high as about 31% by weight. The theoretical lead content of a diresinate prepared from a rosin of theoretical acid number is 25.6%. This amount of lead thus represents the maximum obtainable in a resinate by either the precipitation or fusion methods. By use of polymerized rosin as the rosin component and by use of the fusion process described it is possible, in accordance with this invention, to prepare lead resinates containing more than the theoretical combining proportion of lead based on the acidity of the rosin and higher than that heretofore obtainable with ordinary rosin.

In carrying out the process a polymerized rosin is reacted with a lead compound capable of reaction therewith to provide a salt. Such a compound may be a basic lead compound or it may be a lead salt of a volatile weak acid, or any other lead compound which under the fusion conditions liberates its lead. Suitable lead compounds are, for example, lead acetate, lead borate, lead lactate, lead formate, lead butyrate, lead oxide, mixtures of lead oxide with a fatty acid lead salt as the acetate, mixtures of lead oxide and a fatty acid as acetic acid, etc. While the reactivity of lead oxide with polymerized rosin is satisfactory for preparation of resinates of polymerized rosin, it is desirable in some instances to employ it in admixture with a fatty acid salt or a fatty acid to provide clear resinates. A small amount of calcium acetate or other fatty acid salt of calcium or a fatty acid salt of zinc, cobalt, manganese, etc. may be employed with the lead oxide, if desired, to facilitate the reaction of the lead oxide. When such auxiliary agents are used, they combine partially with the polymerized rosin also.

The reaction is performed by heating the polymerized rosin to a temperature in the range of about 190° C. to about 330° C. and adding the lead compound either gradually or at one time, preferably while agitating the mixture. Foaming occurs during the reaction and agitation serves to hold such foaming to a minimum. The foaming is more severe at the lower temperatures and the reaction is also slower. At temperatures above about 310° C. the reaction is very vigorous and the yield becomes diminished due to volatilization of light ends from the polymerized rosin. Temperatures in the range of about 190° C. to about 300° C. are therefore preferred for the reaction.

The time of reaction to form the novel resinates is dependent on the temperature employed, the particular lead compound used, the degree of agitation, the amount of metal being introduced, as well as other factors. Thus the reaction time may be varied from about 10 minutes to several hours. Presence of an inert atmosphere, such as may be provided by carbon dioxide, nitrogen, flue gas, etc., prevents oxidation of the polymerized rosin and the resinate at the elevated temperatures employed and is therefore desirable, though not essential.

When sufficient reactive lead compond is included to give a resinate containing above about 29% of lead, the resinates obtained in accordance with the invention containing above about 29% of lead will not be entirely soluble in organic solvents such as toluene. Such resinates are therefore not as generally useful as the resinates containing the lower amounts of lead but are suited to more specific uses where such insolubility characteristics are no disadvantage.

The polymerized rosins which may be employed in the process of the invention may be those derived from any of the various grades of wood or gum rosin, or the rosin acids contained therein as abietic acid, pimaric acid, sapinic acid, etc. They may be produced from such rosins or rosin acids by polymerization according to any of the known methods, such as for example, by treatment with various catalysts as sulfuric acid, organic substituted sulfuric acids, boron trifluoride, metallic halides, zinc chloride, aluminum chloride, hydrofluoric acid, or by treatment of the rosins with a high voltage, high frequency discharge or by treatment with an acid sludge formed by treatment of rosin with sulfuric acid such as described in an application, Serial No. 328,864, filed April 10, 1940 by Clell E. Tyler. The polymerization of rosin by any of the procedures such as mentioned above is carried out usually by treatment of the rosin dissolved in some suitable organic solvent. If desired the polymerized rosin may be purified or refined before preparation of the fused lead resinate. The polymerized rosins which are useful in this invention will be those having a drop melting point from about 5° C. to about 100° C. above the melting point of the original rosin used in the polymerization. Thus they will have a drop melting point within the broad range of about 90° C. to about 175° C. and preferably about 95° C. to about 150° C. They will have an acid number usually above about 100 and preferably from about 135 to about 185.

The improved lead resinates described in accordance with this invention will have melting points considerably above the melting point of any lead resinate heretofore obtained from ordinary rosin. Their coalescing temperatures will also be considerably higher. They will contain a higher percentage of lead than prior lead resinates. They will be clear, homogeneous resinous compositions and will contain substantially no free polymerized rosin. They will be less subject to spontaneous ignition than the lead resinates prepared from ordinary rosin. They will be of a more soluble nature than lead resinates from ordinary rosin, and their solutions in organic solvents as benzene, toluene, mineral spirits, etc. will be more stable. They will be considerably more useful as driers in paint compositions because of these improvements and because of their higher metal content. They will also be more compatible with film-forming materials than the comparable lead resinates of ordinary rosin.

The following specific examples illustrate the various embodiments of the invention:

Example 1

A polymerized rosin prepared by treatment of K wood rosin with sulfuric acid and having an acid number of 145 and a melting point (drop) of 98° C. was used to produce a lead resinate in the following manner. Six hundred fifty parts by weight of the polymerized rosin were melted and heated to a temperature of 240° C. in a nitrogen atmosphere. Addition of 500 parts by weight of lead acetate was then started in small portions at a time with continuous agitation while permitting the reaction to become complete before each subsequent addition of lead acetate, as evidenced by the reduction in foaming. The temperature was raised gradually during the addition to a maximum of 290° C. After addition of lead acetate was complete and the foaming had subsided the resinate was allowed to cool. The total reaction time was 35 minutes. The lead resinate obtained was a clear, homogeneous resin having a lead content of 29.5% and a melting point (drop) of 176° C.

Example 2

Four hundred parts by weight of the polymerized rosin used in Example 1 were heated to 240° C. in a carbon dioxide atmosphere and 258 parts by weight of lead acetate added in small portions at a time with agitation, allowing the foaming to subside before each subsequent addition. The temperature was raised gradually to 295° C. during the addition, the total addition time being 60 minutes. The resinate obtained after cooling had a drop melting point of 173° C. and contained 26% of lead. It was clear and homogeneous.

Example 3

A polymerized rosin obtained by polymerization of K wood rosin with boron trifluoride and having an acid number of 112 and melting point of 107° C. was converted into a lead resinate by heating 400 parts by weight of the polymerized rosin to a temperature of 260° C. and adding 272 parts by weight of lead acetate gradually in small portions at a time with agitation. The temperature was raised gradually to 290° C. during the addition, which required 80 minutes. The resinate obtained contained 27% of lead, was clear and homogeneous, and had a drop melting point of 185° C.

It will be understood that the details and examples hereinbefore set forth are illustrative only and that the invention as herein broadly described and claimed is in no way limited thereby.

What I claim and desire to protect by Letters Patent is:

1. A lead resinate of a polymerized rosin, said resinate having a lead content greater than the equivalent combining proportion of the polymerized rosin but not in excess of about 31%, by weight.

2. A lead resinate of a polymerized rosin, said resinate having a lead content greater than the equivalent combining proportion of the polymerized rosin but not in excess of about 29%, by weight, and characterized by complete solubility in toluene.

3. A lead resinate of a polymerized rosin, said resinate having a lead content greater than the equivalent combining proportion of the polymerized rosin but not in excess of about 31%, by weight, said polymerized rosin having been prepared by polymerization of rosin with sulfuric acid as a catalyst.

4. The method of producing a lead resinate of a polymerized rosin, said resinate having a lead content greater than the equivalent combining proportion of the polymerized rosin but not in excess of about 31%, by weight, which comprises fusing a polymerized rosin with a lead compound capable of reaction with the polymerized rosin, in an amount sufficient to give a resinate of the above defined lead content and at a temperature within the range of about 190° C. to about 330° C.

5. The method of producing a lead resinate of a polymerized rosin, said resinate having a lead content greater than the equivalent combining proportion of the polymerized rosin but not in excess of about 31%, by weight, which comprises fusing a polymerized rosin with a lead compound capable of reaction with the polymerized rosin, in an amount sufficient to give a resinate of the above defined lead content and at a temperature within the range of about 190° C. to about 300° C.

6. The method of producing a lead resinate of a polymerized rosin, said resinate having a lead content greater than the equivalent combining proportion of the polymerized rosin but not in excess of about 31%, by weight, which comprises fusing a polymerized rosin with lead acetate in an amount sufficient to give a resinate of the above defined lead content at a temperature within the range of about 190° C. to about 330° C.

7. The method of producing a lead resinate of a polymerized rosin, said resinate having a lead content greater than the equivalent combining proportion of the polymerized rosin but not in excess of about 31%, by weight, which comprises fusing a polymerized rosin with lead oxide in an amount sufficient to give a resinate of the above defined lead content and in the presence of a small amount of calcium acetate as catalyst at a temperature within the range of about 190° C. to about 330° C.

8. The method of producing a lead resinate of a polymerized rosin, said resinate having a lead content greater than the equivalent combining proportion of the polymerized rosin but not in excess of about 31%, by weight, which comprises fusing a polymerized rosin with a mixture of lead oxide and lead acetate in an amount sufficient to give a resinate of the above defined lead content at a temperature within the range of about 190° C. to about 330° C.

PAUL R. MOSHER.